United States Patent [19]

Ehrecke et al.

[11] Patent Number: 4,573,308
[45] Date of Patent: Mar. 4, 1986

[54] HARVESTING PLATFORM WITH A FLOATING CUTTERBAR

[75] Inventors: Kevin L. Ehrecke, Davenport, Iowa; Jerome A. Braet, East Moline, Ill.; James H. Bassett, Davenport, Iowa

[73] Assignee: Deere & Company, Moline, Ill.

[21] Appl. No.: 595,869

[22] Filed: Apr. 2, 1984

[51] Int. Cl.⁴ .................................................. A01D 67/00
[52] U.S. Cl. ........................................ 56/14.4; 56/15.8; 56/208
[58] Field of Search .................... 56/10.2, 10.4, 14.4, 56/14.5, 15.8, 15.9, 208, DIG. 15

[56] References Cited

U.S. PATENT DOCUMENTS

| | | | |
|---|---|---|---|
| 3,597,907 | 8/1971 | Neal | 56/208 |
| 3,886,718 | 6/1975 | Talbot | 56/208 |
| 3,982,383 | 9/1976 | Mott | 56/11.6 |
| 4,011,709 | 3/1977 | Mott et al. | 56/10.4 |
| 4,091,602 | 5/1978 | Williams et al. | 56/14.4 |
| 4,206,583 | 6/1980 | Week et al. | 56/15.8 |
| 4,414,793 | 11/1983 | Halls | 56/14.4 |
| 4,441,307 | 4/1984 | Enzmann | 56/208 |
| 4,473,993 | 10/1984 | Jennings et al. | 56/208 |

Primary Examiner—Robert P. Swiatek
Assistant Examiner—David L. Tarnoff

[57] ABSTRACT

In a flexible floating cutterbar cutting platform for a combine harvester, compact spring elements connected to cutterbar suspension linkage subassemblies are remotely controlled for adjustment of cutterbar counterbalance force so that pressure between the ground and the cutterbar skid plates may be adjusted, on-the-go, to suit varying harvesting conditions. Pinned pivotable connection of the cutterbar suspension linkage subassemblies to the rigid portion of the platform facilitate assembly and offer an improved method of adjustment of cutterbar attitude relative to the ground (tilt) when in working position.

23 Claims, 7 Drawing Figures

HARVESTING PLATFORM WITH A FLOATING CUTTERBAR

BACKGROUND OF THE INVENTION

This invention concerns a harvesting or gathering platform for the header of a harvester and especially a platform equipped with a flexible floating cutterbar.

Flexible cutting platforms are well known. Typically, they are part of a forward mounted header of a self-propelled harvester such as a combine. They are particularly useful when harvesting efficiency depends on cutting a crop (such as soybeans) uniformly close to the ground along the length of the cutterbar. Such a platform is described in some detail in U.S. Pat. No. 3,982,383, Mott sharing an assignee with the present application.

To facilitate cutting close to the ground, the cutterbar is connected so that it may float vertically relative to the platform. Typically, some form of spring is provided in the suspension of the cutterbar as a counterbalance to reduce the ground pressure of a shoe or skid plate of the cutterbar assembly so as to avoid "bulldozing" of the ground surface or dragging of crop material.

In a common flotation arrangement (see, for example, U.S. Pat. No. 3,886,718 Talbot) rearwardly extending cutterbar support arms are pivotally attached to the underside of the platform and are biased upwards by a leaf spring between each arm and the platform. Counterbalance force can be adjusted only by manipulation of a clip securing the spring to the support arm under the platform, an inconvenient location. In another arrangement, where cutterbar movement is also essentially pivoting about a single rearwardly disposed pivot under the platform, the upward bias of the cutterbar comes from a compression spring behind the rear wall of the platform. These springs are more accessible for adjustment but adjustment of the platform float pressure depends on separate adjustment of a plurality of springs and friction in the spring linkage makes float pressure somewhat unpredictable (see U.S. Pat. No. 4,206,583 Week). In '383 Mott, the thin sheet metal apron or feed plate extending between the cutterbar and the fixed portion of the platform floor is mounted so that it serves as a counterbalance spring as well as a floor portion but is essentially nonadjustable.

Conventionally, a fairly generous vertical or up and down flotation range of the cutterbar relative to the platform floor is provided by the suspension arrangements. Thus, by adjusting the vertical position above the ground of the header and hence of the rigid portion of the platform, an operator chooses a nominal operating condition in which the cutterbar is floating in a particular portion of the total flotation range. In most conventional arrangements, the operator must accept a change of cutterbar ground pressure when he changes platform height because of the related change in counterbalance spring deflection. (It must be noted however, that Week claims a linkage arrangement which makes counterbalance force independent of position in the flotation range.)

Thus, of the cutterbar flotation adjustment arrangements known, all are relatively inconvenient and none lends itself to convenient on-the-go adjustment of cutterbar ground pressure. Most, if not all, have the undesirable characteristic of ground pressure varying with up and down displacement of the cutterbar relative to the platform.

The use of an approximately parallel linkage suspension for the cutterbar, as in Mott, is advantageous in ensuring that cutterbar attitude remains in a desirable range while floating. The linkage is attached to the underside of the platform by a frame member tied to a rigid floor portion. However, occasional necessary adjustment of the basic cutterbar attitude involves a flexing of the platform floor which is undesirable.

SUMMARY OF THE INVENTION

Accordingly, it is an object of the invention to provide a counterbalanced flotation arrangement for the flexible cutterbar of a harvesting header platform which includes a counterbalance or float spring arrangement which may be adjusted conveniently, and preferably on-the-go, so that the cutterbar ground pressure may be conveniently adjusted to suit variations in operating condition throughout the range of platform operating heights and which is simply attached to the platform for more convenient assembly and service.

Preferably, these objects are realized when a floating cutterbar is carried at the forward edge of a transversely extending array of ground-engaging shoes or skid plates each of which is suspended from the underside of the platform by an upwardly and rearwardly extending link or linkage. Each shoe and linkage is associated with a compact biasing element of a type readily adaptable to remote control of adjustment and disposed so as to bias its linkage directly so as to produce a counterbalancing force for the cutterbar. Exemplary biasing elements in the form of a fluid linear actuator and alternatively, a flat wound spiral spring, are disclosed. Both are examples of elements readily adaptable to remote and simultaneous adjustment. The fluid linear actuators may be coupled to a common accumulator creating a hydraulic spring. Accumulator pressure may readily be varied by conventional means. The spiral springs may be carried on a common, transversely extending rockshaft, rotational adjustment of which may be effected locally by manual means or remotely by, for example, a hydraulic cylinder and/or a simple mechanical linkage.

Preferably the cutterbar suspension linkage is such as to maintain the skid plate in an approximately constant attitude within the entire float range. This may be accomplished by carrying the skid plate on a compound linkage such as a pair of approximately parallel links, front and rear, normally extending rearwardly and upwardly from the skid plate. The biasing element may conveniently be applied to either of the parallel links, but preferably the forward one.

It is a feature of the invention that the platform attachment points of the linkage may be provided in a tilt frame or channel pivotably and adjustably attached to the underside of the platform. This permits adjustment of the tilt channel in a vertical plane about a transverse pivot axis for making adjustment of attitude and initial position of the cutterbar relative to the platform without the disadvantage of flexing the platform floor.

Another feature of the invention is that each of the linkages providing the suspension of the cutterbar may constitute a modular subassembly including a ground-engaging skid plate attachable at its forward edge to the cutterbar, a pair of rearwardly and upwardly extending substantially parallel links, a fore-and-aft extending tilt frame for pivotal attachment of the upper end of the links and having a transversely extending pivot bore for registering with a corresponding bore in a fixed member of the platform underside so that the linkage subassembly may be attached to the platform by insertion of a single pin and subsequent engagement of the means for adjustably locking the tilt frame in a preselected position.

Given the convenience of remote adjustment of a float spring according to the invention and hence of cutterbar ground pressure, it is within the scope of the invention to use, in combination, a spring-like apron or feed plate between platform floor and cutterbar which may also contribute to the counterbalancing force. Thus, the rearward edge of the apron may be rigidly attached to the platform and the forward edge may bear upwards against a stop at the rear edge of the cutterbar providing a simple spring loaded seal against crop loss between the cutterbar and the apron and, in a simple overlapping arrangement, accommodating some relative fore-and-aft displacement between the cutterbar and the fixed portion of the platform as the cutterbar floats vertically relative to the platform.

A further feature of the pinned and pivotably adjustable tilt frame is that the spring element may be made an integral part of the linkage subassembly for convenience in assembly. In addition, tilt adjustment may then be made without disturbing the relative adjustment of the bias element connected between the parallel linkage and the tilt channel itself.

DESCRIPTION OF THE PREFERRED EMBODIMENT

Figure 1:
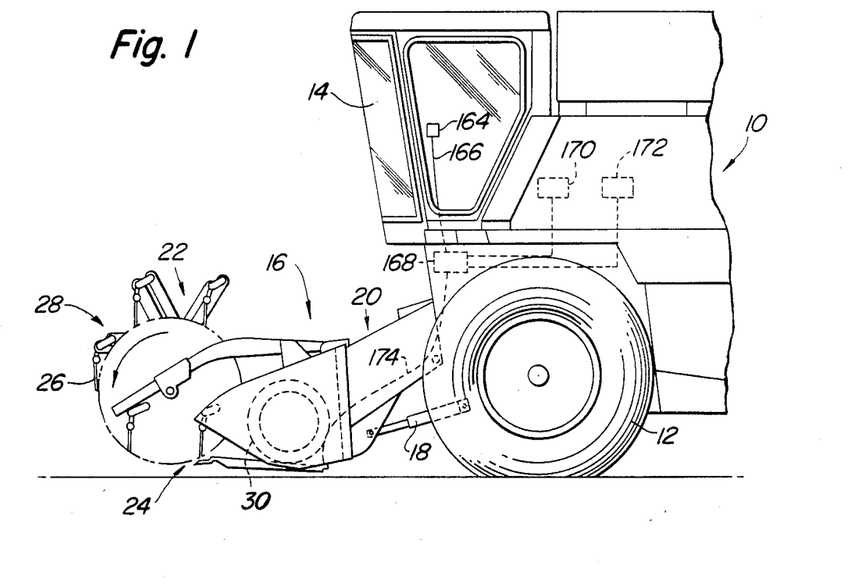
FIG. 1 is a left-hand side elevation of the forward portion of a self-propelled combine embodying the invention.

The invention is embodied in a self-propelled grain harvester, the forward portion of which is shown in FIG. 1. The combine is generally conventional and includes a body 10, propelled by forward drive wheels 12, and a forward mounted operator station 14. Operating height of the forward-carried header 16 is controlled by hydraulic lift cylinders 18 and includes a feederhouse 20, pivotably attached to the body 10, and a laterally extending gatherer 22, in this case a generally conventional grain platform with flexible floating cutterbar 24.

In operation, as the combine advances, the fingers 26 of reel 28 guide standing crop material onto the cutterbar and rearwardly into the transverse conveyor auger 30 which converges it and delivers it to the feederhouse 20 which conveys it upwardly and rearwardly to the body 10 for processing.

Figure 2:
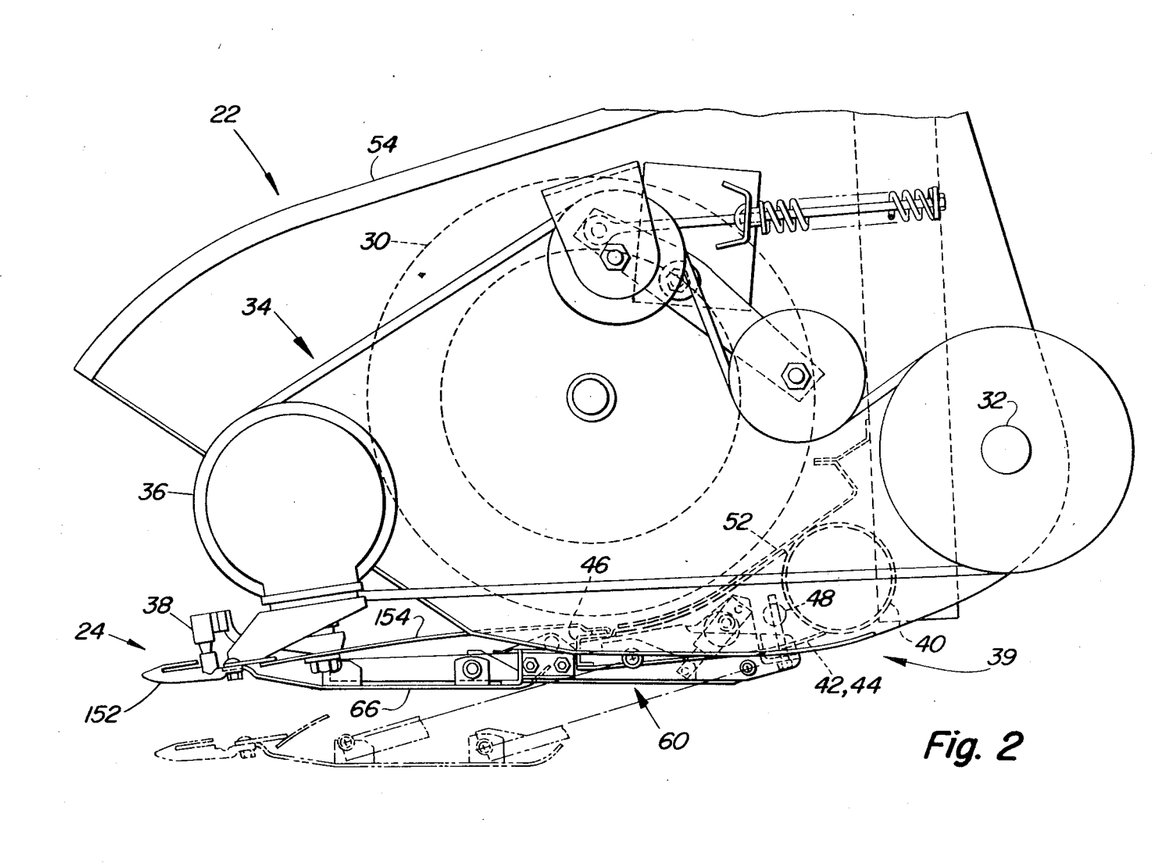
FIG. 2 is an enlarged view of the left-hand side of the harvesting platform of the combine of FIG. 1.

As best seen in FIG. 2, the drive of the cutterbar 24 is conventional and receives an input from a platform backshaft 32 and is transmitted by V-belt drive 34 through wobble box 36 and connector 38 to the knife of the cutterbar. The wobble box 36 is supported by the cutterbar assembly 24 so that the final drive to the knife is unaffected by vertical floating of the cutterbar 24.

Apart from members contributing to the floating cutterbar suspension, the structure of the gatherer 22, is generally conventional and includes, in part, a main frame 39 including a tubular lateral main frame member 40 spanning the platform. Details of the structure are seen best in FIGS. 3, 4 and 5. A series of pairs of platform floor support gussets, 42 left-hand and 44 right-hand, are rigidly attached to the tubular member 40 and extend forward and somewhat downwards. A second lateral frame member 46 is supported by the forward ends of the gussets 42, 44 and substantially spans the lateral extent of the platform. Just forward of the main tubular member 40, each pair of gussets 42, 44 supports a laterally extending bar member 48 which has a central threaded hole 50.

The gussets 42, 44 cradle a fixed floor portion 52 of the gatherer. The curvature of this floor portion 52 partially follows the periphery of the conveyor auger 30 and cooperates with it in converging material towards the feederhouse 20. A pair of opposite side sheets (left-hand 54 only shown) define the lateral extremities of the gatherer platform 22.

Figure 5:
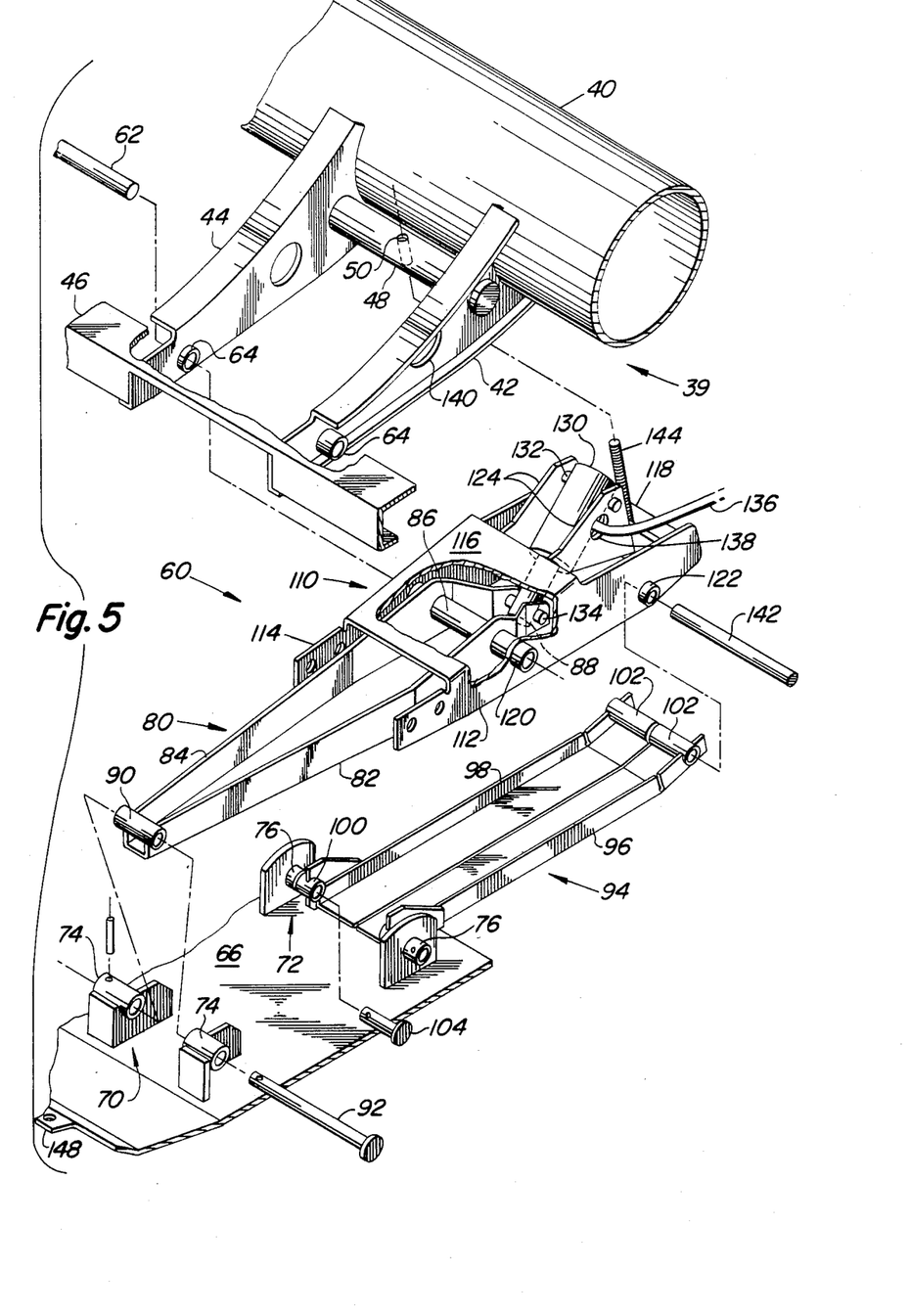
FIG. 5 is an exploded view of the principal components of one of the cutterbar suspension assemblies and related platform frame members.

Turning now more particularly to structure involved in the invention and looking particularly at FIG. 5—the floating cutterbar assembly 24 (not shown in FIG. 5) is supported or suspended by a series of laterally spaced linkage subassemblies or modules 60, the essentials of which are shown in FIG. 5 in exploded fashion. Each subassembly 60 may be pivotably secured to the frame as an assembly or module by a single pin 62 passing through bushings 64 in a forward portion of the main frame gussets 42, 44 with its attitude being controlled by an adjustable tie or tilt rod as described below.

A first link of the module 60 is a ground-engaging shoe or skid plate 66. In assembly, the fore-and-aft extending edges 68 of neighboring skid plates are contiguous so that the underside of the platform presents a substantially continuous but flexible shoe extending the full width of the platform as indicated in the partial view of FIG. 4. The upper surface of the skid plate 66 carries two pairs of pivot lugs—70 front and 72 rear. Each lug carries a bushing 74, 76 respectively, coaxial in each pair. Lift arm assembly 80 comprises a welded assembly with side members 82, 84, respectively, embracing a main pivot bushing 86, and including a pair of rear pivot holes 88 and a forward pivot bushing 90. Pin 92 connects the lift arm assembly 80 to the shoe 66 passing through the forward shoe bushings 74 and the lift arm forward bushing 90.

Push arm assembly 94 comprises a third link in the cutterbar suspension system. In assembly, as indicated in FIG. 2, it lies approximately parallel to the lift arm assembly 80. It is divided into independently pivoted left- and right-hand push arms 96 and 98, respectively. Each arm includes a front and rear pivot bushing 100, 102, respectively. Pins 104 connect the push arm assembly 94 to the skid plate 66 at the rear bushings Each linkage subassembly 60 is anchored to the platform frame 39 by a tilt frame or channel 110. Opposite side walls 112, 114, respectively, of the tilt frame are connected by a bridge-like top 116 and a rear cross member 118. A pair of coaxial main pivot bushings 120 and, rearwardly of them, a pair of push arm pivot bushings 122, are carried in the respective side walls 112, 114. A pair of hydraulic cylinder pivot lugs 124 extend upwardly towards the rear of the tilt frame 110.

In preparation for subassembly and installation of the linkage 60 into the platform, the rear pivots 102 of the push arm sections 96, 98 are brought into register with the rear pivots 122 of the tilt frame 110 as indicated in FIG. 5 and pivot pin 142 inserted. Next, a single acting hydraulic cylinder 130 is connected between the tilt frame cylinder lugs 124 (pin 132, at the anchor end of the cylinder) and the lift arm assembly rear pivot 88 (pin 134, at the load end of the cylinder). Hydraulic connection to the cylinder is by hose 136 threaded through suitable holes 138 and 140, respectively, in the tilt frame lug 124 and main frame gusset 42. The skid plate 66 may be already connected to the lift and push arms 80, 94 as indicated above. Each subassembly 60 may now be connected to the platform frame 39 by bringing the lift arm main pivot 86 and tilt frame main pivots 120 into register with each other as indicated in FIG. 5 and then into register with the pivot bushings 64 of the main frame 39 and inserting pin 62.

To complete the mechanical connection of the linkage subassembly 60 to the platform frame, tilt adjusting bolt 144 with locknut 146 is installed in the tilt frame rear cross piece 118 and threaded into the threaded hole 50 of the anchoring or nut member 48 carried by the platform frame.

Now, with a series of linkage subassemblies 60 installed side-by-side beneath the platform, the cutterbar assembly 24 may be installed, the connection being made at lugs 148 on the forward edge of each skid plate 66, with suitable fasteners 150 clamping together the skid plate 66 and the cutterbar bed plate 153.

The flexible spring-like feed plate 154 provides a conveying surface bridging the gap between the floating cutterbar 24 and the fixed floor portion 52 of the platform. The rear edge 156 of the feed plate is rigidly attached along the frame cross member 46 while its free front edge 158 bears on the underside of the cutterbar bed plate 153.

Figures 3, 4:
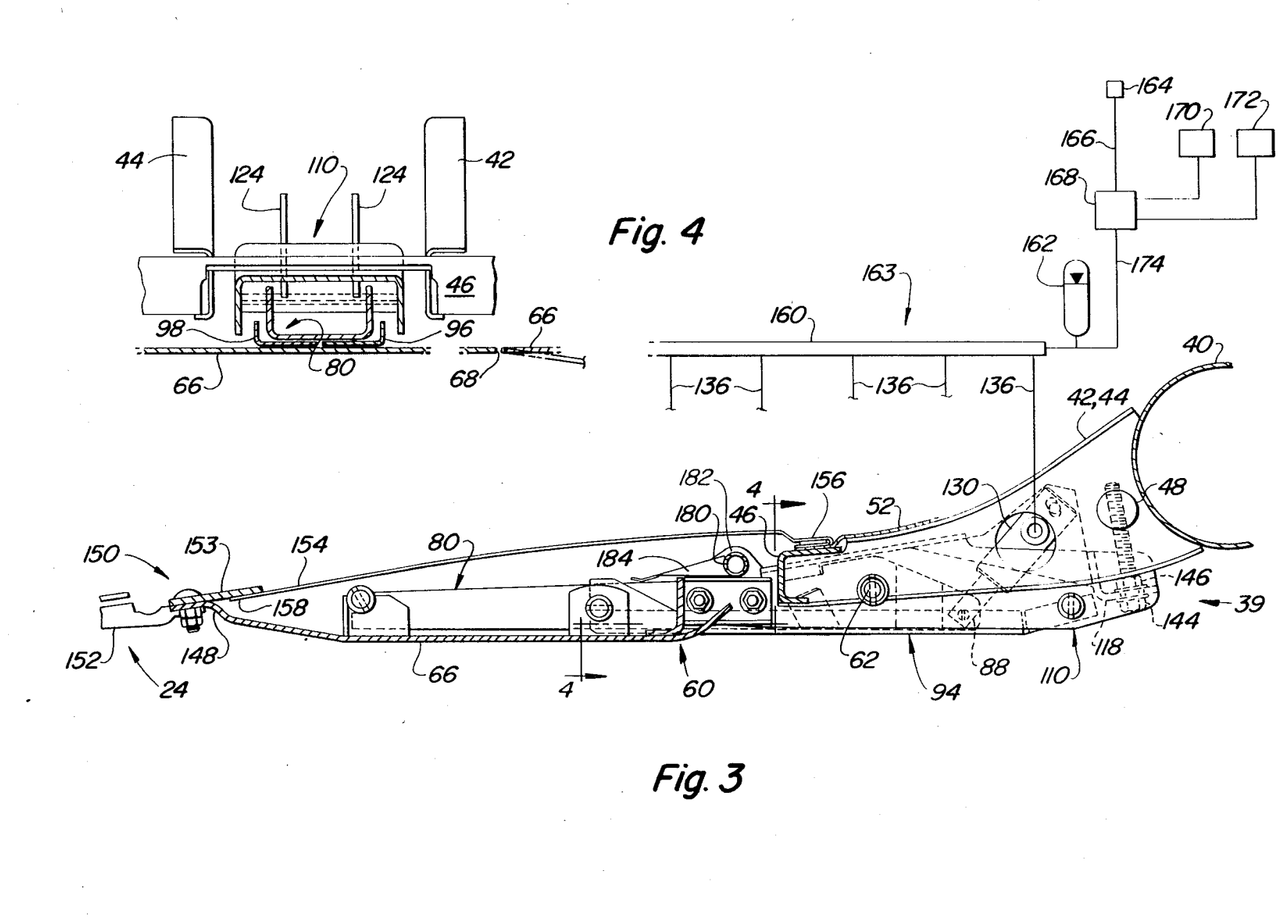
FIG. 3 is a further enlarged partial view partially cut-away and sectioned on a fore-and-aft vertical plane intermediate the ends of the platform and showing some details of the platform floor and floating cutterbar suspension system.
FIG. 4 is a sectional view taken approximately on line 4—4 of FIG. 3.

Installation of the cutterbar flotation system is completed by connecting each hydraulic cylinder hose 136 into a hydraulic manifold 160, shown only diagrammatically in FIG. 3. An accumulator 162 is also connected to the manifold 160. The "spring" system 163 comprising the cylinders 130, manifold 160, and accumulator 162 is normally pressurized and closed. The conventional accumulator 162 (a gas-filled version is indicated as an example) provides compressibility in the system 163 so that each cylinder 130 may function essentially independently as a compression spring. It is noted that in this spring system, the spring power derives from a common source (accumulator 162 with manifold 160) but serves a series of spring elements (cylinders 130). Charge pressure in the system 163 is controlled from the operator station 14 by a control switch 164 through a wiring harness 166 and an electrohydraulic control unit 168 carried by the combine body 10. Necessary hydraulic and electric power comes from sources 170, 172, respectively, also carried by the combine body 10. Hydraulic fluid is conducted to the platform "spring" system 163 by hydraulic line 174.

Nominal operating height of the platform and hence position in the float range, may be controlled by an automatic header height control system responsive to relative movement between the cutterbar and the rigid portion of the platform. Such systems are well known—for details, see for example, U.S. Pat. No. 4,332,126, Van Auwelaer et al hereby incorporated by reference. The drawings here (see FIG. 3) show only the sensor portion of the system in which a transverse rockshaft 180 pivotably supported by brackets 182 carried by a forward portion of the tilt frame 110, carries a series of sensor arms or plates 184 which bear only on the upper edges of the lift arms 80. Thus, the height control system is responsive at any given time only to the uppermost of the ground-engaging shoes or skid plates 66 when the cutterbar is "floating" over uneven ground.

Figure 6:
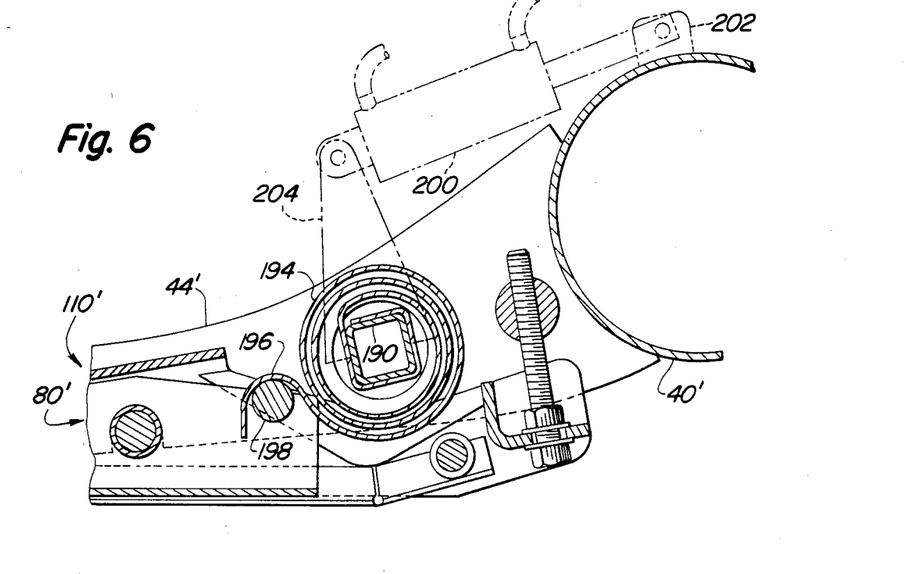
FIG. 6 is a further enlarged partially sectioned view of an alternative embodiment of the invention showing, in side elevation, a rearward portion of one of the cutterbar suspension assemblies and its connections to the platform frame.
Figure 7:
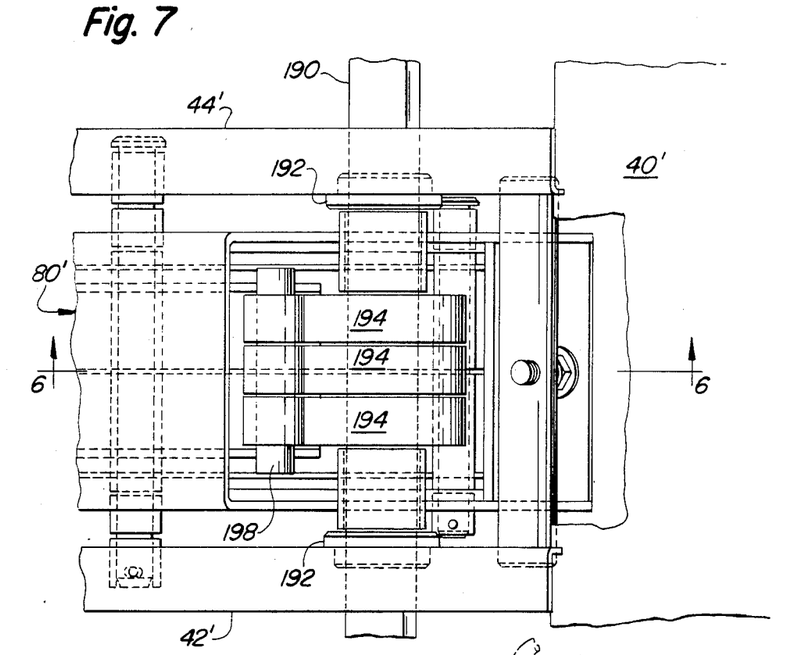
FIG. 7 is an overhead view of the subject matter of FIG. 6.

An alternative embodiment of the invention is illustrated in FIGS. 6 and 7. The structure here is generally similar to that described above. However, in this case, a mechanical rather than a fluid spring is used and the spring is effective between the lift arm 80' and a fixed anchor-rockshaft 190, adjustably journalled in bushings 192 carried by frame members 42', 44'. In this exemplary embodiment the spring comprises a set of three flat-wound spiral springs 194 anchored at their inner ends to the rockshaft 190 and engaging at their free or load ends 196, a pin 198 carried by the lift arm assembly 80'. Spring loading may be controlled by any convenient means. FIG. 6 suggests (in phantom outline only) an arrangement controllable from the operator station in which a hydraulic cylinder 200 connected between a fixed lug 202 on the platform frame and a crank 204 on the rockshaft 190 permits selective rotational adjustment of the rockshaft 190 to vary the spring setting. In other alternatives (not shown) the hydraulic cylinder 200 may be replaced by a turnbuckle providing a mechanical screw adjustment of rockshaft position and spring setting; or a worm and segment-gear, which is self locking and may be manually or power operated. It will be noted of course, that a single control or input simultaneously adjusts all of a series of sets of springs 194 arrayed across the platform. Note too that the spring may comprise any convenient number of one or more elements and that, for example, spring strength provided at the opposite ends of the platform may differ from that provided in the body of the platform, so as to ensure an approximately uniform floating characteristic over the whole length of the cutterbar.

In operation, floating cutterbar suspension systems according to the invention, make it possible for an operator to select appropriate ground pressure in whatever portion of the (vertical) float range he chooses to work. This may conveniently be done from the operator station and "on-the-go" when remote control adjustment is provided. Float pressure can be controlled independently of position in the float range.

Cutterbar/skid plate tilt adjustment to establish a desired attitude of the cutterbar 24 and skid plates 66 relative to the ground and/or to establish the basic straightness of the cutterbar are easily made by manipulation of the tilt adjusting bolt and nut, 144, 146. Each skid plate linkage subassembly 60 pivots as a unit about the pivot pin 62 without distortion or strain of the platform floor structure. When the counterbalance spring is self-contained in the linkage subassembly as in the hydraulic spring version described above, tilt adjustment does not affect counterbalance spring setting.

The feed plate 154 is supported cantilever fashion from its rearward edge 156 and extends forward. The mounting tends to bias the feed plate upwards so that, in assembly, it exerts a pressure on the underside of the cutterbar bed plate 153. The material of the feed plate 154 must have sufficient resilience to at least maintain contact with the cutterbar bed plate throughout the flotation range. However, in keeping with the invention, the feed plate 154 may be designed to make a significant contribution to the counterbalancing of the cutterbar 24. When remote control of counterbalancing is provided any variation in the contribution of the feed plate (according to the position in the float range chosen for operation) can readily be compensated for to maintain a desired ground pressure at the skid plates.

We claim:

1. A mobile harvesting machine comprising:
   a mobile body;
   an operator station carried by the body;
   a vertically adjustable harvesting platform for forward mounting on the body including a transversely elongated platform frame having opposite sides, a platform floor extending between the opposite sides, a transverse flexible floating cutterbar assembly extending between the opposite sides forwardly of the floor and operative to flex and float vertically to a limited degree to follow the contour of the ground and a plurality of transversely spaced linkage assemblies operatively mounting the cutterbar assembly on the platform frame for independent vertical movement of laterally spaced portions of the cutterbar relative to the platform frame so that the cutterbar assembly is free to follow the contour of the ground, each linkage assembly including:
      a generally fore-and-aft link having its rearward end pivotably connected to a support means carried by the platform frame by an axially transverse pivot and its forward end connected to the cutterbar assembly so that the cutterbar may swing in a vertical arc relative to the platform frame; and
      bias means having an anchor end and a load end, the anchor end being normally in a fixed relationship to the platform frame and the load end being connected to the link, the bias means being operable to exert a lifting force on said link and hence on the cutterbar assembly; and control means for simultaneously adjusting all of the bias means for controlling the lifting force.

2. The harvesting machine of claim 1 wherein the support means comprises a tilt frame mounted for pivoting about a transverse pivot axis and selectively adjustable about said axis for selectively adjusting the attitude of the linkage within a fore-and-aft vertical plane.

3. The harvesting machine of claim 2 wherein each bias means anchor end is disposed in a permanently fixed relationship to the tilt frame.

4. The harvesting machine of claim 3 wherein each bias means is a fluid spring including a linear hydraulic actuator, each actuator having opposite ends comprising the anchor end and load end respectively and being in fluid communication with an accumulator, said actuators and accumulator comprising a closed fluid system operable to be selectively pressurized so as to provide an adjustable bias on the linkage assemblies.

5. The harvesting machine of claim 1 wherein the control means includes a selector switch at the operator station.

6. The harvesting machine of claim 1 and further including a transversely elongated resiliently flexible feed plate having its rearward end rigidly attached to the platform floor and disposed so that its forward end is engageable by the cutterbar assembly and biases the cutterbar assembly upward, the forward end of the feed plate deflecting downwardly as the cutterbar assembly swings downwardly to follow the contour of the ground so that the feed plate cooperates with the bias means to partially counterbalance the weight of the cutterbar assembly.

7. The harvesting machine of claim 1 wherein the bias means is a flat spiral spring and wherein a rearward portion of the link directly engages the load end of the spiral spring and wherein the platform frame carries a transversely extending rotatably adjustable spring rockshaft and each spiral spring is anchored to said rockshaft so that the collective lifting force provided by the springs is responsive to rotational adjustment of said rockshaft.

8. A mobile harvesting machine comprising:
   a mobile body;
   an operator station carried by the body;
   a vertically adjustable harvesting platform for forward mounting on the body including a transversely elongated platform frame having opposite sides, a platform floor extending between the opposite sides, a transverse flexible floating cutterbar assembly extending between the opposite sides forwardly of the floor and operative to flex and float vertically to a limited degree to follow the contour of the ground, and a plurality of transversely spaced linkage assemblies operatively mounting the cutterbar assembly on the platform frame for independent vertical movement of laterally spaced portions of the cutterbar relative to the platform frame so that the cutterbar assembly is free to follow the contour of the ground, each linkage assembly including:
      a generally fore-and-aft push link having its rearward end pivotably connected to a support means carried by the platform frame by an axially transverse pivot and its forward end connected to the cutterbar assembly by an axially transverse pivot;
      a generally fore-and-aft link generally parallel to and forwardly of the push link, the forward and rearward ends of each lift link being respectively pivotably connected to the cutterbar assembly and the support means for pivoting about transverse axes to form a parallel type linkage with the push links so that the cutterbar may swing in a vertical arc while maintaining a generally horizontal attitude; and bias means having an anchor end and a load end, the anchor end being normally in a fixed relationship to the platform frame and the load end being connected to one of the links, the bias means being operable to exert a lifting force on said link and hence on the cutterbar assembly; and
   control means for simultaneously adjusting all of the bias means for controlling the lifting force.

9. The harvesting machine of claim 8 wherein the load end of the bias means is connected to the lift link.

10. The harvesting machine of claim 8 wherein the support means comprises a tilt frame mounted for pivoting about a transverse pivot axis and selectively adjustable about said axis for selectively adjusting the attitude of the linkage within a fore-and-aft vertical plane.

11. The harvesting machine of claim 10 wherein the lift link and the tilt frame share a common pivot axis.

12. The harvesting machine of claim 11 wherein the tilt frame includes an up stop and a down stop engageable by the lift link for limiting the pivoting movement of said lift link.

13. The harvesting machine of claim 10 wherein each bias means anchor end is disposed in a permanently fixed relationship to the tilt frame.

14. The harvesting machine of claim 13 wherein the bias means is a fluid spring.

15. The harvesting machine of claim 14 wherein the fluid spring includes a plurality of linear hydraulic actuators, each actuator having opposite ends comprising the anchor end and load end respectively, and being in fluid communication with an accumulator, said actuators and accumulator comprising a closed fluid system operable to be selectively pressurized so as to provide an adjustable bias on the linkage assembly.

16. The harvesting machine of claim 8 wherein the control means includes a selector switch at the operator station.

17. The harvesting machine of claim 8 wherein the support means comprises a tilt frame mounted for pivoting about a transverse pivot axis and selectively adjustable about said axis for selectively adjusting the attitude of the linkage within a fore-and-aft vertical plane and further including a transversely elongated array of automatic header height control sensing elements carried by and subject to the adjustable movement of the tilt frame and disposed so that each sensing element is responsive to pivoting movement of one of the linkages and so that the basic relationship of the sensing elements to the linkages is unaffected by adjustment of the tilt frame.

18. The harvesting machine of claim 8 and further including a transversely elongated resiliently flexible feed plate having its rearward end rigidly attached to the platform floor and disposed so that its forward end is engageable by the cutterbar assembly and biases the cutterbar assembly upward, the forward end of the feed plate deflecting downwardly as the cutterbar assembly swings downwardly to follow the contour of the ground so that the feed plate cooperates with the bias means to partially counterbalance the weight of the cutterbar assembly.

19. The harvesting machine of claim 8 wherein the bias means is a flat spiral spring and the anchor end is in a fixed relation to the platform frame and the load end is connected to the lift link rearwardly of its transverse pivot axis.

20. The harvesting machine of claim 19 wherein a rearward portion of the lift link directly engages the load end of the spiral spring.

21. The harvesting machine of claim 19 wherein the control means includes transversely extending rotatably adjustable counterbalance spring rockshaft carried by the platform frame and each spiral spring is anchored to said rockshaft so that the collective counterbalance force provided by the springs is responsive to rotational adjustment of said rockshaft.

22. In a harvesting platform for a mobile harvesting machine including a transversely elongated platform frame having opposite sides, a platform floor extending between the opposite sides, and a transverse flexible floating cutterbar assembly extending between the opposite sides forwardly of the floor and operative to flex vertically to a limited degree to follow the contour of the ground, a plurality of skid plate subassemblies, each subassembly comprising:
 a tilt frame for connecting to and being carried by the platform frame so as to be pivotably adjustable about a transverse pivot axis with respect to the platform frame;
 a ground-engaging skid plate having a forward portion connectible to a rearward portion of the cutterbar;
 a lift link having rearward and forward ends pivotally connected respectively to the tilt frame and to the skid plate;
 a push link spaced rearwardly from the lift link having forward and rearward ends pivotably connected respectively to the skid plate and the tilt frame, the lift link and the push link being substantially parallel to each other and forming a parallel linkage with the tilt frame and the skid plate so that, when the subassembly is connected to and carried by the platform frame, the skid plate may swing in a vertical arc without substantial change in attitude.

23. The invention of claim 22 wherein, in each subassembly, the pivot axis of the rearward end of the lift link and the transverse pivot axis of the tilt frame coincide.

* * * * *

UNITED STATES PATENT AND TRADEMARK OFFICE
CERTIFICATE OF CORRECTION

PATENT NO. : 4,573,308

DATED : 4 March 1986

INVENTOR(S) : Kevin Lavern Ehrecke et al

It is certified that error appears in the above-identified patent and that said Letters Patent is hereby corrected as shown below:

Column 8, line 50, after "fore-and-aft" insert -- lift --.

Column 10, line 12, after "includes" insert -- a --.

Signed and Sealed this

Twenty-eighth Day of October, 1986

[SEAL]

*Attest:*

DONALD J. QUIGG

*Attesting Officer*     *Commissioner of Patents and Trademarks*